US011810017B2

(12) United States Patent
Anderson et al.

(10) Patent No.: US 11,810,017 B2
(45) Date of Patent: Nov. 7, 2023

(54) METHOD AND SYSTEM FOR UNIVERSAL CONTROL ACCOUNT ACTIVITIES

(71) Applicant: MasterCard International Incorporated, Purchase, NY (US)

(72) Inventors: James John Anderson, Brooklyn, NY (US); Sandeep Malhotra, Greenwich, CT (US); Amyn Mohamed Dhala, Edison, NJ (US); Alan Johnson, Maldon (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 888 days.

(21) Appl. No.: 15/296,527

(22) Filed: Oct. 18, 2016

(65) Prior Publication Data

US 2018/0107994 A1    Apr. 19, 2018

(51) Int. Cl.
*G06Q 20/10* (2012.01)
*G06Q 40/02* (2023.01)
(Continued)

(52) U.S. Cl.
CPC .......... *G06Q 20/102* (2013.01); *G06Q 20/20* (2013.01); *G06Q 20/385* (2013.01); *G06Q 20/40* (2013.01); *G06Q 40/02* (2013.01)

(58) Field of Classification Search
CPC ...... G06Q 20/405; G06Q 20/20; G06Q 20/40; G06Q 20/102; G06Q 20/38; G06Q 40/02; G06Q 20/385; G06Q 20/227
See application file for complete search history.

(56) References Cited

U.S. PATENT DOCUMENTS 6,636,833 B1    10/2003  Flitcroft et al.
7,136,835 B1 *  11/2006  Flitcroft ................. G06Q 20/24
                                                       705/39
(Continued)

OTHER PUBLICATIONS

Notification of Transmittal of the International Search Report and the Written Opinion of the International Searching Authority (Forms PCT/ISA/220, PCT/ISA/210 and PCT/ISA/237) dated Nov. 2, 2017, by the European Patent Office in corresponding International Application No. PCT/US2017/050940. (12 pages).

(Continued)

*Primary Examiner* — Namrata Boveja
*Assistant Examiner* — Carol A See
(74) *Attorney, Agent, or Firm* — Panitch Schwarze Belisario & Nadel LLP

(57) ABSTRACT

A method for application of account and transaction controls on a payment token includes: storing, in a first device of a system, a control profile including a token number and transaction controls; storing, in a second device of the system, a token profile including the token number and a corresponding account number; receiving, at the first device, a transaction message including a data element having the token number and additional transaction data; determining, by the first device, compliance with the transaction controls based on the additional transaction data; transmitting the transaction message from the first to the second device; replacing, by the second device, the token number with the account number in the transaction message; and transmitting, by the second device, the transaction message to a financial institution associated with the account number.

18 Claims, 6 Drawing Sheets

(51) Int. Cl.
  *G06Q 20/40* (2012.01)
  *G06Q 20/20* (2012.01)
  *G06Q 20/38* (2012.01)

(56) References Cited

U.S. PATENT DOCUMENTS

| | | | |
|---|---|---|---|
| 7,567,934 | B2 | 7/2009 | Flitcroft et al. |
| 7,571,142 | B1* | 8/2009 | Flitcroft ................ G06Q 40/00 |
| | | | 705/44 |
| 7,593,896 | B1 | 9/2009 | Flitcroft et al. |
| 8,676,707 | B2 | 3/2014 | Flitcroft et al. |
| 8,756,150 | B2 | 6/2014 | Flitcroft et al. |
| 2009/0070260 | A1 | 3/2009 | Flitcroft et al. |
| 2010/0312636 | A1 | 12/2010 | Coulter et al. |
| 2013/0024364 | A1* | 1/2013 | Shrivastava ........... G06Q 20/12 |
| | | | 705/39 |
| 2014/0269291 | A1* | 9/2014 | Dwivedi ........... H04W 28/0289 |
| | | | 370/232 |
| 2015/0112870 | A1 | 4/2015 | Nagasundaram et al. |
| 2015/0254647 | A1* | 9/2015 | Bondesen ............ G06Q 20/36 |
| | | | 705/41 |
| 2015/0254657 | A1* | 9/2015 | Bondesen ............ G06Q 20/405 |
| | | | 705/44 |
| 2016/0224976 | A1* | 8/2016 | Basu ...................... G06Q 20/12 |

OTHER PUBLICATIONS

Office Action dated Mar. 26, 2021, by the Canadian Intellectual Property Office in corresponding Canadian Patent Application No. 3,040,471 (6 pages).

Office Action (First Examination Report) dated Jan. 29, 2021, by the Patent Office, Government of India, in corresponding India Patent Application No. 201917018363 with an English Translation of the Office Action. (11 pages).

Office Action dated Jul. 28, 2022 in Canadian Application No. 2,908,875.

Examination Report dated Sep. 7, 2022 in Australian Application No. 2017347645.

Notification of Second Office Action, dated Apr. 29, 2023, issued in corresponding Chinese Patent Application Serial No. 201780064316.9, 16 pages.

Examination Report No. 2 for Standard Patent Application, dated Jan. 9, 2023, issued in corresponding Australian Application No. 2017347645, 4 pps.

Final Rejection Decision dated Aug. 12, 2023 in corresponding Chinese Patent Application Serial No. 201780064316.9, 16 pages.

* cited by examiner

METHOD AND SYSTEM FOR UNIVERSAL CONTROL ACCOUNT ACTIVITIES

FIELD

The present disclosure relates to technology providing universal control of account activities, specifically the universal application of account and transaction controls on a payment token used in an electronic payment transaction via the use of multiple computing devices in a processing system.

BACKGROUND

As technology has developed, individuals and entities have enjoyed more and more control over various aspects of their daily lives. Traditionally, consumers were limited to paying for a payment transaction with paper currency. Over time, new payment instruments were developed, starting with checks and then moving into various types of payment cards, providing consumers with a choice of what payment instrument to use, enabling the consumer to control how to engage in transactions based on what they valued more, such as the anonymity of paper currency, the convenience of a debit card, the freedom of a credit card, etc.

As payment networks and financial institutions have become more technologically sophisticated, these entities have even provided additional options to consumers for control of their user of payment cards. One such development has been the creation and implementation of controlled payment numbers, which, as defined in more detail below, is a number for a transaction account that is subject to one or more controls or limits on usage in payment transactions. Such controls can include, for instance, a control on the maximum amount for a single transaction, a control on the geographic location where transactions may take place, or a control on the type of transaction (e.g., only for in-person, not e-commerce, transactions).

However, existing payment network and financial institution systems often require the generation and issuance of special controlled payment numbers for a transaction account for use of account and transaction controls. Other technological developments by payment networks and financial institutions have also involved the generation and issuance of new numbers for a transaction account for use of associated products and services. One such development includes the use of payment tokens. Payment tokens are tokenizations of existing payment credentials of a transaction account, used in place of the original payment credentials at the initiation of a payment transaction, for protection of the original payment credentials. Payment tokens have seen increased usage with the advancement of mobile device technology, where payment tokens are issued to a mobile device for use as a payment instrument in an electronic transaction in place of traditional payment credentials, such that compromise of the mobile device may not compromise the transaction account as a whole.

Unfortunately, both transaction controls and payment tokens rely on the use of an alternative number to the original account number issued for a transaction account. As a result, current processing systems for payment networks and financial institutions lack the ability to utilize both transaction controls and payment tokens at the same time. Some methods have been developed that have a single computing system applying transaction controls and performing mapping of a payment token to a corresponding account number. However, such a method may only be suitable when a payment token is generated and issued specifically for that purpose; such a system may therefore not be compatible with existing transaction accounts for which transaction controls and/or payment tokens are already used.

Thus, there is a need for a technical solution where transaction controls may be used in conjunction with payment tokens that may be implemented in conjunction with existing transaction accounts and using existing payment tokens and transaction controls. There is a need for a technological solution using an improved computing system that can remedy the deficiencies in the shortcomings of existing technical systems to provide for the application of transaction controls to a payment token mapped to a primary account number via the use of multiple computing devices in a processing system.

SUMMARY

The present disclosure provides a description of systems and methods for the application of account and transaction controls on a payment token.

A method for application of account and transaction controls on a payment token includes: storing, in a control database of a first computing device of a processing system, a control profile, wherein the control profile includes a structured data set related to a transaction account including at least a payment token number and one or more account and/or transaction controls; storing, in a token database of a second computing device of the processing system, a token profile, wherein the token profile includes a structured data set related to the transaction account including at least the payment token number and a corresponding transaction account number; receiving, by a receiving device of the first computing device of the processing system, a transaction message via a payment network, wherein the transaction message is formatted pursuant to one or more standards and includes data related to a payment transaction including at least a plurality of data elements including at least a first data element configured to store the payment token number and one or more additional data elements configured to store additional transaction data; determining, by a transaction processing module of the first computing device of the processing system, compliance of the payment transaction with the one or more account and/or transaction controls included in the control profile based on satisfaction of the one or more account and/or transaction controls of the payment transaction based on the additional transaction data stored in the one or more additional data elements; electronically transmitting, by a transmitting device of the first computing device of the processing system, the transaction message to the second computing device of the processing system; receiving, by a receiving device of the second computing device of the processing system, the transaction message; replacing, by a transaction processing module of the second computing device of the processing system, the payment token number stored in the first data element included in the transaction message with the corresponding transaction account number stored in the token profile in the token database of the second computing device of the processing system; and electronically transmitting, by a transmitting device of the second computing device of the processing system, the transaction message including the corresponding transaction account number stored in the first data element, to an issuing financial institution via the payment network, wherein the issuing financial institution is associated with the corresponding transaction account number.

A system for application of account and transaction controls on a payment token includes: a control database of a first computing device of a processing system configured to store a control profile, wherein the control profile includes a structured data set related to a transaction account including at least a payment token number and one or more account and/or transaction controls; a token database of a second computing device of the processing system configured to store a token profile, wherein the token profile includes a structured data set related to the transaction account including at least the payment token number and a corresponding transaction account number; a receiving device of the first computing device of the processing system configured to receive a transaction message via a payment network, wherein the transaction message is formatted pursuant to one or more standards and includes data related to a payment transaction including at least a plurality of data elements including at least a first data element configured to store the payment token number and one or more additional data elements configured to store additional transaction data; a transaction processing module of the first computing device of the processing system configured to determine compliance of the payment transaction with the one or more account and/or transaction controls included in the control profile based on satisfaction of the one or more account and/or transaction controls of the payment transaction based on the additional transaction data stored in the one or more additional data elements; a transmitting device of the first computing device of the processing system configured to electronically transmit the transaction message to the second computing device of the processing system; a receiving device of the second computing device of the processing system configured to receive the transaction message; a transaction processing module of the second computing device of the processing system configured to replace the payment token number stored in the first data element included in the transaction message with the corresponding transaction account number stored in the token profile in the token database of the second computing device of the processing system; and a transmitting device of the second computing device of the processing system configured to electronically transmit the transaction message including the corresponding transaction account number stored in the first data element, to an issuing financial institution via the payment network, wherein the issuing financial institution is associated with the corresponding transaction account number.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
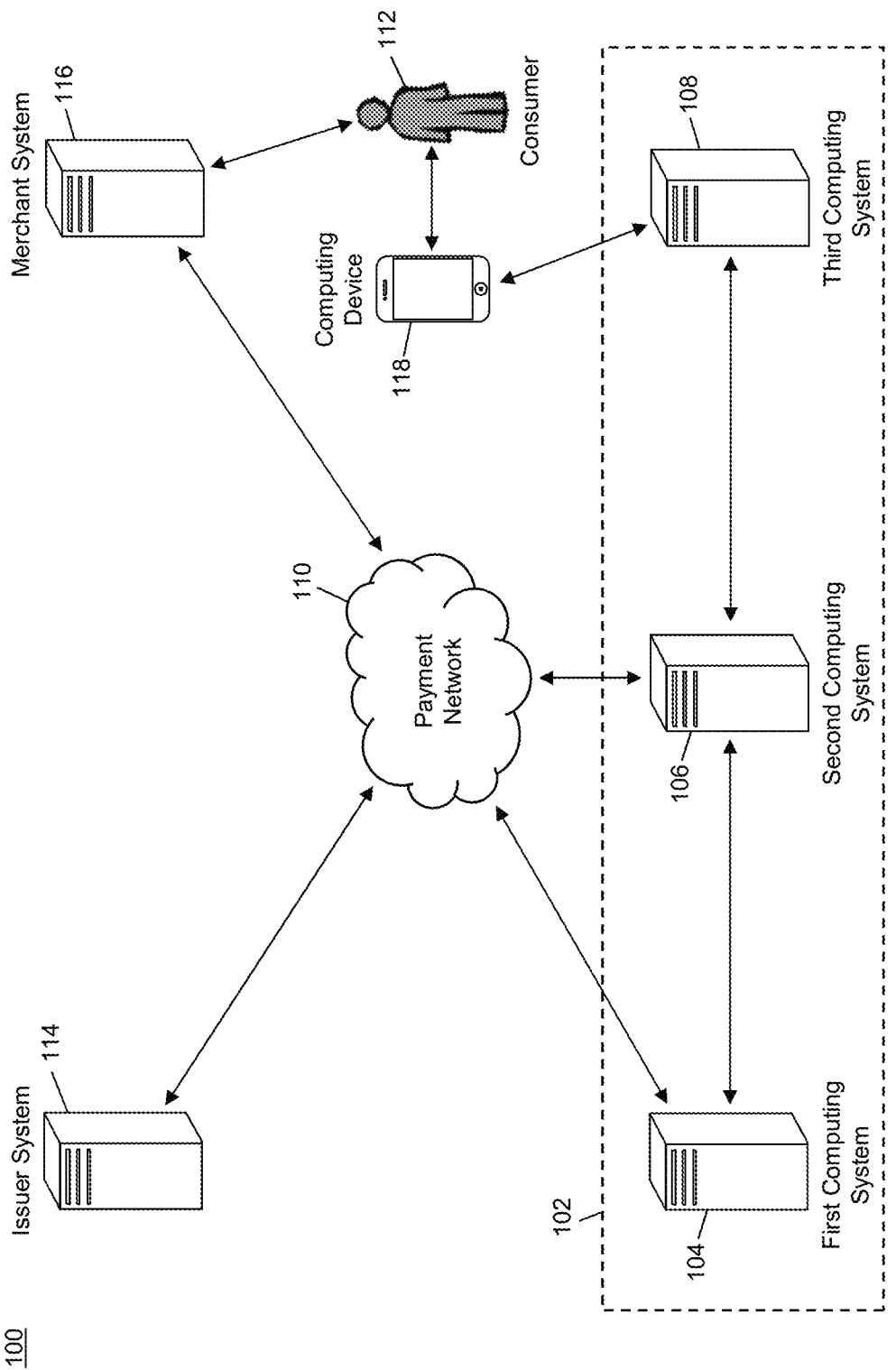
FIG. 1 is a block diagram illustrating a high level system architecture for the application of account and transaction controls on a payment token in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul. 30, 2008; U.S. patent application Ser. No. 12/268,063, filed Nov. 10, 2008; and U.S. patent application Ser. No. 12/359,971, filed Jan. 26, 2009; each of which are herein incorporated by reference in their entirety.

System for Application of Controls to a Payment Token

FIG. 1 illustrates a system 100 for the application of account and transaction controls to a payment token in an electronic payment transaction, implemented via the use of multiple computing devices in a processing system.

The system 100 may include a processing system 102. The processing system 102 may be comprised of at least a first computing system 104 and a second computing system 106. The first computing system 104 and second computing system 106 may be comprised of one or more computing devices specifically configured to perform the functions related thereto as discussed herein. Each computing system comprising the processing system 102 may be configured to communicate using one or more suitable communication networks and methods, which may include a communication network internal to the processing system 102 (e.g., inaccessible to external computing devices and systems). Each computing system comprising the processing system 102 may include a plurality of modules and engines suitable for performing the functions associated therewith, such as those included in the computing system 200 illustrated in FIG. 2 and discussed in more detail below.

The first computing system 104, as discussed in more detail below, may be configured to apply account and transaction controls to a payment transaction for which a payment token is used for the funding therefor. Account and transaction controls may be controls and/or limits on the usage of the associated transaction account (e.g., and any payment token issued therefrom). Controls may be specific to an individual transaction or may be applicable to the transaction account, which may be a control for an aggregation of payment transactions funded or attempted to be funded by the transaction account. Controls may include, for example, a control on a transaction amount for a transaction, an aggregate transaction amount for a number of transactions and/or a period of time (e.g., a day, a week, a month, etc.), transaction frequency, number of transactions over a period of time, merchant name, merchant industry, merchant identifier, geographic location, type of transaction, product name, product type, product identifier, transaction time, transaction data, etc. In some instances, a transaction or account control may utilize a combination of controls. For example, a control may be placed on a transaction account placing a limit on the aggregate transaction amount for a specific merchant category (e.g., restaurants) for a month. In some instances, multiple account or transaction controls may be placed on a transaction account. For example, a transaction account may be subject to a control on transaction amount for individual transactions, a daily aggregate transaction amount for transactions on weekdays, a daily aggregate transaction amount for weekends, a limit on merchant industry during specific times of day, etc.

The second computing device 106, as discussed in more detail below, may be configured to map a payment token to a corresponding transaction account number associated with a transaction account and replace the payment token with the corresponding account number for processing of an electronic payment transaction based thereon. A payment token may be comprised of at least a payment token number, which may be a tokenization of the corresponding transaction account number. In some instances, the payment token number may be formatted pursuant to one or more standards applicable to the formatting of the corresponding transaction account number. For example, the payment token number may be the same number of digits as the corresponding transaction account number and have the digits formatted in a similar manner. In some instances, the payment token number and the corresponding transaction account number may include a common portion, such as a bank identification number or issuer identification number associated with a financial institution corresponding to the associated transaction account.

The system 100 may include an issuer system 114. The issuer system may be a system associated with an issuing financial institution. The issuing financial institution may be a financial institution, such as an issuing bank, or other suitable entity configured to issue a transaction account to a consumer 112 for use in funding payment transactions. As part of the issuance of a transaction account to the consumer 112, the issuer system 114 may generate a transaction account number for use in the processing of payment transactions funded via the transaction account.

A payment token may be generated for use with the transaction account issued to the consumer 112. In some embodiments, the issuer system 114 may generate and issue the payment token to the consumer 112. In such an embodiment, the issuer system 114 may register the payment token and corresponding transaction account number with the processing system 102 for use in conjunction with the methods discussed herein. In some cases, the processing system 102 may be a part of the issuer system 114, where registration may be done using internal communications and processes. In other cases, the processing system 102 may electronically transmit one or more data signals to the processing system 102 using a suitable communication network and method.

In other embodiments, the processing system 102 may be configured to generate the payment token for the transaction account. In such an embodiment, the issuer system 114 may register the transaction account with the processing system 102, and the processing system 102 may generate the payment token corresponding to the registered transaction account number. In some cases, the processing system 102 may provide the payment token back to the issuer system 114 for issuing to the consumer 112. In other cases, the issuer system 114 may provide communication details to the processing system 102 for issuing the payment token to the consumer 112. Methods for provisioning a payment token to a consumer 112 will be apparent to persons having skill in the relevant art. The second computing system 106 of the processing system 102 may be configured to store an association between the transaction account number for the registered transaction account and the corresponding payment token (e.g., as generated by the issuer system 114 or the processing system 102).

Following issuance of the payment token to the consumer 112, the consumer 112 may be able to set one or more account or transaction controls applicable to payment transactions funded via the payment token. The consumer 112 may set the controls using suitable methods for the setting of account and transaction controls that will be apparent to persons having skill in the relevant art. For example, the consumer 112 may use a web page or application program via a computing device (e.g., the computing device 118, discussed in more detail below) to access an interface used for the setting of one or more account or transaction controls for a transaction account. The account or transaction controls may be set directly with the first computing system 104, such as via the electronic transmission of data signals from the consumer 112 (e.g., via a suitable computing device) to the first computing system 104 using a suitable communication network and method, or set via the issuer system 114. For example, the issuer system 114 may provide an interface for the consumer 112 to set account or transaction controls, which may then be forwarded from the issuer system 114 to the first computing system 104. The first computing system 104 may be configured to register the account or transaction controls as associated with the payment token corresponding to the transaction account for which the controls are set.

Once the consumer 112 has been issued the payment token and has registered their account and transaction controls, the consumer 112 may initiate a payment transaction with a merchant. As part of the initiation of the payment transaction, the consumer 112 may provide the issued payment token to a merchant system 116, which may be a point of sale system or other suitable system. The payment token may be provided to the merchant system 116 using any suitable method, such as via the presenting and reading of a physical payment card with the payment token encoded thereon, the display and reading of a machine-readable code encoded with the payment token, the entry and transmission of the payment token via a computing device, the transmission of the payment token using near field communication or other suitable communication method, etc.

Once the merchant system 116 has received the payment token, the merchant system 116 may submit the payment token and transaction information for the payment transaction (collectively referred to herein as "transaction data") to a payment network 110 for processing. In some instances, the merchant system 116 may directly submit the transaction data to the payment network 110 via payment rails associated therewith. In other instances, the merchant system 116 may submit the transaction data to one or more intermediate entities, such as an acquiring financial institution and/or gateway processor, for forwarding to the payment network 110 via the associated payment rails.

In an exemplary embodiment, the transaction data may be formatted into a transaction message (e.g., by the merchant system 116, an acquiring financial institution, a gateway processor, or other suitable entity) prior to submission to the payment network 110. A transaction message may be a specially formatted data message that is formatted pursuant to one or more standards governing the exchange of financial transaction messages, such as the International Organization of Standardization's ISO 8583 standard. A transaction message may include a message type indicator indicative of a type of the transaction message, such as an authorization request or authorization response. The transaction message may also include a plurality of data elements, where each data element may be configured to store a portion of the transaction data for the payment transaction. Some transaction messages may also include one or more bitmaps, which may be configured to store data indicating the data elements included in the transaction message and the data stored therein.

The payment network 110 may receive a transaction message for the payment transaction that includes at least a first data element configured to store a primary account number, which may store the payment token number for the payment token provided by the consumer 112 for the transaction, and one or more additional data elements configured to store additional transaction data. The additional transaction data may include, for example, additional payment token data (e.g., transaction counters, cryptograms, etc.), a transaction amount, transaction time, transaction data, geographic location, merchant name, merchant industry, merchant identifier, product data, issuer data, acquirer data, offer data, reward data, loyalty data, point of sale data, etc. The transaction message may also include a message type indicator indicative of an authorization request. The payment network 110 may forward the authorization request to the processing system 102 for processing thereof via the payment rails associated with the payment network 110. In some embodiments, the payment network 110 may include the processing system 102 and may forward the authorization request to the first computing system 104 via internal communication methods of the payment network 110.

The first computing system 104 of the processing system 102 may receive the authorization request for the payment transaction. The first computing system 104 may parse the payment token number from the first data element included in the authorization request, and may identify account or transaction controls registered for the payment token. The first computing system 104 may then determine if the payment transaction is in compliance with the account or transaction controls. The determination may be based on a comparison of the additional transaction data stored in the one or more additional data elements included in the authorization request and the set account or transaction controls, and may also be based on additional data, such as prior authorization requests or data parsed therefrom. For instance, a control on the transaction amount for each transaction may be applicable to the transaction amount stored in a corresponding data element included in the authorization request, and a control on an aggregate transaction amount for spending during a week may be applicable to the transaction amount stored in a corresponding data element included in the authorization request combined with a stored aggregate spending amount (e.g., based on transaction amounts in prior transactions during the week).

The first computing system 104 may proceed with the processing of the payment transaction based on the determination. In some embodiments, the first computing system 104 may store the determination in a corresponding data element included in the authorization request, which may be used by the issuer system 114 in the approval or denial of the payment transaction. For example, if the payment transaction is not in compliance with the set controls, then the data element may indicate accordingly, and the issuer system 114 may decline the payment transaction based thereon. In other embodiments, the first computing system 104 may be authorized (e.g., by the issuer system 114, such as during registration of the transaction account or an agreement between the issuer system 114 and processing system 102) to decline a payment transaction if the transaction is not determined to be in compliance with the account or transaction controls. In such embodiments, the first computing system 104 may generate (e.g., by newly generating or modifying the authorization request) a transaction message having a message type indicator indicative of an authorization response that includes a data element configured to store a response code indicating denial of the payment transaction. In some cases, the response code may indicate the non-compliance with an account or transaction control as a reason for the denial. The first computing system 104 may then return the authorization response to the payment network 110 via the payment rails, which may forward the authorization response to the merchant system 116 (e.g., via any intermediate entities, as applicable) for finalization of the payment transaction.

If the payment transaction is in compliance with the transaction controls, or if the first computing system 104 does not return an authorization response for non-compliance, the first computing system 104 may electronically transmit the authorization request to the second computing system 106 via a suitable internal communication network of the processing system 102. The second computing system 106 may receive the authorization request from the first computing system 104 and may be configured to map the payment token number to its corresponding transaction account number. The second computing system 106 may identify the registered association of the payment token number stored in the first data element included in the authorization request and may replace the payment token number with the corresponding transaction account number.

The authorization request may then have the transaction account number stored in the first data element included therein. The second computing system 106 may then forward the authorization request to the payment network 110 via the associated payment rails, for forwarding to the issuer system 114 for further processing. Further processing may include, for example, approval or denial of the payment transaction, such as based on an account balance or available credit, and the return of an authorization response from the issuer system 114 to the payment network 110 via the associated payment rails. Additional information regarding the routing of transaction messages and processing of payment transactions is discussed in more detail below with respect to the process 500 illustrated in FIG. 5.

In embodiments where the processing system 102 may be a part of the payment network 110, the second computing system 106 may be configured to electronically transmit the authorization request to the issuer system 114 directly via the payment rails. In embodiments where the processing system 102 may be a part of the issuer system 114, the second computing system 106 may electronically transmit the authorization request to another system of the issuer system 114 suitable for processing payment transactions via internal communication networks of the issuer system 114. In some such embodiments, the second computing system 106 or another computing system of the processing system 102 may be configured to perform traditional transaction processing functions of the issuer system 114.

Once the transaction has been approved or denied by the issuer system 114, the corresponding authorization response may be forward to the second computing system 102 via the payment rails associated with the payment network 110. The second computing system 102 may then remap the payment token number back into the transaction message, such as by replacing the transaction account number stored in the first data element included in the authorization response with the payment token number initially stored in the first data element. The second computing system 106 may then forward the authorization response for finalization of the payment transaction, such as to the payment network 110 or the merchant system 116 (e.g. or an associated intermediate entity, as applicable).

In some embodiments, the processing system 102 may be further configured to provide notifications to consumers 112 regarding the processing of payment transactions and compliance and management of account and transaction controls for a transaction account. In such embodiments, the processing system 102 may include a third computing system 108. The third computing system 108 may be configured to electronically transmit data signals superimposed or otherwise encoded with notification messages to a computing device 118 associated with a consumer 112 involved in a payment transaction. The computing device 118 may be any type of computing device suitable for performing the functions discussed herein, such as a desktop computer, laptop computer, notebook computer, tablet computer, cellular phone, smart phone, smart watch, smart television, wearable computing device, implantable computing device, etc.

As part of the registration of the transaction account, the third computing system 108 may be supplied with communication details associated with the computing device 118. The communication details may include data suitable for use in providing electronically transmitted communications for receipt by the computing device 118, which may include at least a communication method and address. The address may be a device identifier or other unique value associated with the computing device 118 for the receipt of communications thereby. The communication method may include, for example, e-mail, telephone, short messaging service, multimedia messaging service, a web page, an application program, etc. The address may include, for example, a username, e-mail address, phone number, internet protocol address, media access control address, registration number, serial number, etc. In some instances, the issuer system 114 may provide the communication details to the processing system 102, such as during registration of the transaction account. In other instances, the computing device 118 may provide the communication details to the processing system 102, such as during a registration process initiated by the consumer 112, during provisioning of the payment token (e.g., to the computing device 118), during management of the account or transaction controls, or other interaction between the processing system 102 and consumer 112.

The consumer 112 may register, via the computing device 118, one or more notification conditions with the processing system 102. Notification conditions may be stored in the first computing system 104, second computing system 106, or third computing system 108. Notification conditions may include conditions of a payment transaction under which a notification should be electronically transmitted to the registered computing device 118. Notification conditions may include, for example, the denial of a payment transaction based on an account or transaction control or a specific account or transaction control, the approach of an aggregate limit following an approved payment transaction, the approval of any payment transaction subject to an account or transaction control or specific account or transaction control, etc.

During the processing of a payment transaction by the processing system 102, satisfaction of one or more notification conditions associated with a transaction account may be determined. The determination may be made via the computing system included in the processing system 102 that stores the notification conditions. In some instances, the determination may be made after receipt of the authorization response from the issuer system 114 (e.g., or from the first computing system 104, as applicable). For example, a notification condition based on the status of a control subject to aggregation may be based on if a transaction was approved or denied by the issuer system 114. If a notification condition is satisfied, the computing system that determines the satisfaction may electronically transmit a data signal to the third computing system 108 via the internal communication networks of the processing system 102 that is superimposed or otherwise encoded with an indication of the satisfied condition. The third computing system 108 may then electronically transmit a data signal to the computing device 118 using the communication method and address provided in the communication details, the data signal being superimposed or otherwise encoded with a notification.

The notification may include at least a portion of the transaction data for the payment transaction, such as may be suitable for use by the consumer 112 in identifying to which transaction the notification applies, such as a merchant name, transaction time, transaction date, geographic location, etc. The notification may also include data associated with the condition or other criteria, which may be set by the consumer 112 at the time of registration of the condition. For example, notifications for a declined transaction may provide a reason for the decline (e.g., non-compliance with a transaction control), and may also be set by the consumer 112 to provide additional details (e.g., identify the control that was not complied with, and the basis for such non-compliance). For instance, for a transaction whose transaction amount exceeds a spending limit, the notification sent to the computing device 118 may notify the consumer 112 that their transaction attempted with the specified merchant at the indicated time and date was denied due to the transaction amount being above the previously set spending limit.

Methods and systems discussed herein may enable the processing system 102 to provide for the application of account and transaction controls to payment transactions, as well as the use of payment tokens for payment transactions, and the combination of both to enable the application of account and transaction controls to payment transactions where a payment token was used. In addition, the use of multiple computing systems in the processing system 102 may enable transaction and account controls to be applied to all payment transactions separately from the mapping of payment tokens to corresponding transaction account numbers, which may enable the processing system 102 to process payment transactions where controls may be used without a payment token and where payment tokens not subject to controls may be used, as well as transactions where a payment token is subject to controls. Furthermore, the use of the separate computing systems may enable existing controlled payment numbers and payment tokens to be used in conjunction therewith without modification to existing payment networks 110 and issuer systems 114, due to the separation of the functions via the multiple computing systems. As a result, the processing system 102 may provide for significant technological advantages over existing systems via the unique system architecture and hardware discussed herein.

Computing System

Figure 2:
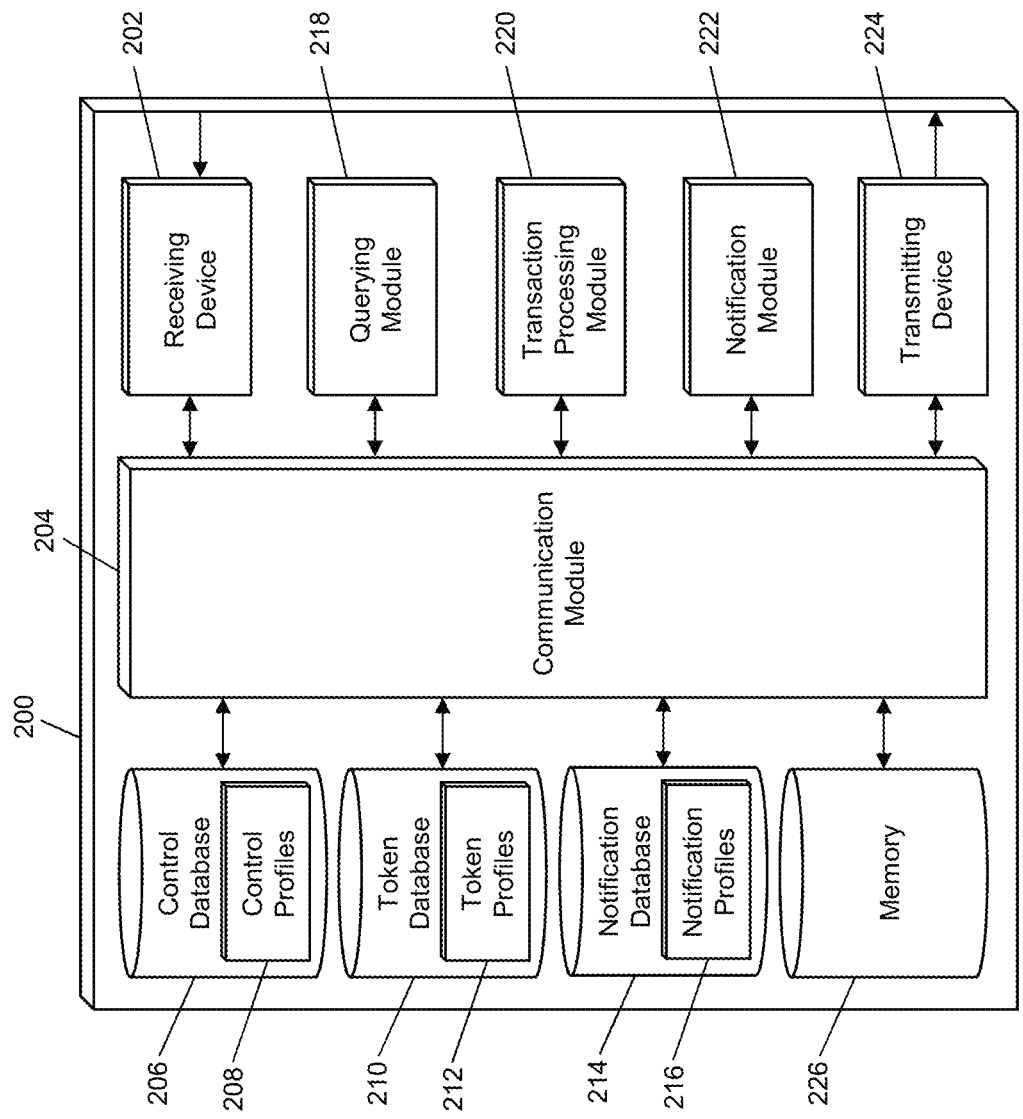
FIG. 2 is a block diagram illustrating a computing system for use in the processing system of FIG. 1 for the application of account and transaction controls, mapping of payment tokens, and transmission of notifications in accordance with exemplary embodiments.

FIG. 2 illustrates an embodiment of a computing system 200 of the processing system 102 in the system 100. It will be apparent to persons having skill in the relevant art that the embodiment of the computing system 200 illustrated in FIG. 2 is provided as illustration only and may not be exhaustive to all possible configurations of the computing systems 200 of the processing system 102 suitable for performing the functions as discussed herein. For example, the computer system 600 illustrated in FIG. 6 and discussed in more detail below may be a suitable configuration of the computing system 200. In some instances, the first computing system 104, second computing system 106, and/or third computing system 108 may include only a portion of the components illustrated in the computing system 200 suitable for performing the functions associated with the respective computing system as discussed herein. For example, the third computing system 108 may include the notification module 222, and may not include a transaction processing module 220 or control database 206, as discussed below.

The computing system 200 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 110 for the transmission of transaction messages that include sensitive financial data and information. In some instances, the receiving device 202 may also be configured to receive data from other computing systems 200, payment networks 110, issuer systems 114, merchant systems 116, computing devices 118, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by payment networks 114 that may be superimposed or otherwise encoded with transaction messages. Transaction messages may be formatted pursuant to one or more standards, such as the ISO 8583 standard, and include a message type indicator and a plurality of data elements, such as data elements configured to store primary account numbers, transaction amount, merchant identifiers, and additional transaction data. The receiving device 202 may also be configured to receive data signals electronically transmitted by other computing systems 200, which may be superimposed or otherwise encoded with transaction messages or other data suitable for use in performing the functions discussed herein. For example, the receiving device 202 of the third computing system 108 may be configured to receive data signals electronically transmitted by the first computing system 104 or second computing system 106 superimposed or otherwise encoded with a satisfied notification condition and a payment token number or corresponding transaction account number.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 218, transaction processing module 220, notification module 222, etc. As used herein, the term "module" may be software or hardware particularly programmed to receive an input, perform one or more processes using the input, and provide an output. The input, output, and processes performed by various modules will be apparent to one skilled in the art based upon the present disclosure.

The computing system 200 may include a control database 206. The control database 206 may be configured to store a plurality of control profiles 208 using a suitable data storage format and schema. The control database 206 may be a relational database that utilizes structured query language for the storage, identification, modifying, updating, accessing, etc. of structured data sets stored therein. Each control profile 208 may be a structured data set configured to store data related to a transaction account subject to one or more account or transaction controls. Each control profile 208 may include at least a payment token number and one or more account and/or transaction controls. The payment token number may be a tokenization of a transaction account number for a transaction account, which may be generated or otherwise identified by the computing system 200 or an associated issuer system 114. The account and/or transaction controls may be controls on payment transactions funded via the related transaction account to which the payment transactions are subject, such that payment transactions must be in compliance with the controls. Account and/or transaction controls may include, for instance, controls on transaction amount, aggregate transaction amount, time, date, geographic location, merchant name, merchant industry, product name, product type, transaction type, etc. In some embodiments, a control profile 208 may also include one or more notification conditions, for use in the transmission of notifications based on payment transactions involving the related transaction account. In some instances, only the first computing system 104 in the processing system 102 may include the control database 206.

The computing system 200 may also include a token database 210. The token database 210 may be configured to store a plurality of token profiles 212 using a suitable data storage format and schema. The token database 210 may be a relational database that utilizes structured query language for the storage, identification, modifying, updating, accessing, etc. of structured data sets stored therein. Each token profile 212 may be a structured data set configured to store data related to a transaction account for which a payment token has been issued. Each token profile 212 may include at least a payment token number for the related payment token and a corresponding transaction account number. In some instances, the token profile 212 may include additional data associated with the payment token and transaction account, such as additional credentials. For example, the token profile 212 may include a transaction counter, cryptograms, etc. for each or both the payment token and transaction account. In some embodiments, a token profile 212 may also include one or more notification conditions, for use in the transmission of notifications based on payment transactions involving the related transaction account. In some instances, only the second computing system 106 in the processing system 102 may include the token database 210.

The computing system 200 may also include a notification database 214. The notification database 214 may be configured to store a plurality of notification profiles 216 using a suitable data storage format and schema. The notification database 214 may be a relational database that utilizes structured query language for the storage, identification, modifying, updating, accessing, etc. of structured data sets stored therein. Each notification profile 216 may be a structured data set configured to store data related to a transaction account registered to receive notifications. Each notification profile 216 may include at least a payment token number or corresponding transaction account number and communication details. The communication details may include at least a communication method and address suitable for use in the electronic transmission of data signals to a computing device 118 associated with the address using the communication method and associated communication protocols. In some instances, only the third computing system 108 in the processing system 102 may include the notification database 214.

The computing system 200 may include a querying module 218. The querying module 218 may be configured to execute queries on databases to identify information. The querying module 218 may receive one or more data values or query strings, and may execute a query string based thereon on an indicated database, such as the control database 206, to identify information stored therein. The querying module 218 may then output the identified information to an appropriate engine or module of the computing system 200 as necessary. The querying module 218 may, for example, execute a query on the control database 206 to identify a control profile 208 related to an authorization request (e.g., received via the receiving device 202) where the included payment token number corresponds to a payment token number stored in the first data element included in the authorization request. In another example, the querying module 218 may execute a query on the token database 210 to identify a token profile 212 for the mapping of a payment token number to a transaction account number in an authorization request or authorization response, and a query on the notification database 214 to identify a notification profile 216 for the transmission of a notification to a computing device 118 related to a payment transaction.

The computing system 200 may also include a transaction processing module 220. The transaction processing module 220 may be configured to perform functions related to the processing of payment transactions as discussed herein. For example, the transaction processing module 220 may be configured to generate and/or modify transaction messages and to electronically transmit transaction messages via the payment rails associated with a payment network 110 or via internal communication methods of the processing system 102. In some instances, such as embodiments where the processing system 102 may be a part of the payment network 110 or issuer system 114, the transaction processing module 220 may be configured to perform functions related to the processing of payment transactions thereby. For example, the transaction processing module 220 may be configured to apply fraud rules to a transaction message, determine approval or denial of a payment transaction, adjust data stored in data elements included in a transaction message, identify financial institutions associated with a transaction, forward transaction messages to appropriate entities for further processing, etc. Additional functions that may be performed by the transaction processing module 220 will be apparent to persons having skill in the relevant art. In some embodiments, the third computing system 108 of the processing system 102 may not include a transaction processing module 220.

The computing system 200 may also include a notification module 222. The notification module 222 may be configured to determine satisfaction of a notification conditions by a payment transaction and generate notifications for pushing to a computing device 118. The notification module 222 may receive notification conditions and transaction data used to determine satisfaction of the notification conditions, may determine if the conditions are satisfied, and my output the result to another module or engine of the computing system 200. Satisfaction of notification conditions may include a comparison of one or more criteria of the notification condition to transaction data stored in the one or more additional data elements included in a received authorization request and/or authorization response for a payment transaction, as well as to data stored in a control profile 208 identified for a payment transaction, such as in instances where criteria may be associated with an account and/or transaction control. The notification module 222 may also receive be configured to generate notifications for satisfied notification conditions, which may include transaction data from the authorization request and/or authorization response for the payment transaction, and may include additional data as specified in relation to the satisfied notification condition, such as if a transaction was approved or denied, a reason for a denial, identification of a transaction control that was not satisfied, updates on aggregate controls, etc.

The computing system 200 may also include a transmitting device 224. The transmitting device 224 may be configured to transmit data over one or more networks via one or more network protocols. In some embodiments, the transmitting device 224 may be configured to transmit data over the payment rails, such as using specially configured infrastructure associated with payment networks 110 for the transmission of transaction messages that include sensitive financial data and information, such as identified payment credentials. In some instances, the transmitting device 224 may be configured to transmit data to other computing systems 200, payment networks 110, issuer systems 114, merchant systems 116, computing devices 118, and other entities via alternative networks, such as the Internet. In some embodiments, the transmitting device 224 may be comprised of multiple devices, such as different transmitting devices for transmitting data over different networks, such as a first transmitting device for transmitting data over the payment rails and a second transmitting device for transmitting data over the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to payment networks 110 that are superimposed or otherwise encoded with transaction messages for payment transactions, which may be formatted pursuant to one or more standards, such as the ISO 8583 standard. Transaction messages electronically transmitted by the computing system 200 may be authorization requests with swapped primary account numbers, authorization responses with reason codes for approval or denial, etc. The transmitting device 224 may also be configured to electronically transmit data signals to other computing systems 200 that may be superimposed or otherwise encoded with data suitable for performing the functions discussed herein. For example, the transmitting device 224 of the second computing system 106 may electronically transmit a data signal to the third computing system 108 superimposed or otherwise encoded with a satisfied notification condition and transaction data. The transmitting device 224 may also be configured to electronically transmit data signals to computing devices 118 using registered communication details, which may include the transmission of the data signals to a specified address using a specified communication method, where such data signals may be superimposed or otherwise encoded with a notification related to a satisfied notification condition, such as may be generated by the notification module 222.

The computing system 200 may also include a memory 226. The memory 226 may be configured to store data for use by the computing system 200 in performing the functions discussed herein. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein.

Process for Application of Controls to a Payment Token

Figure 3:
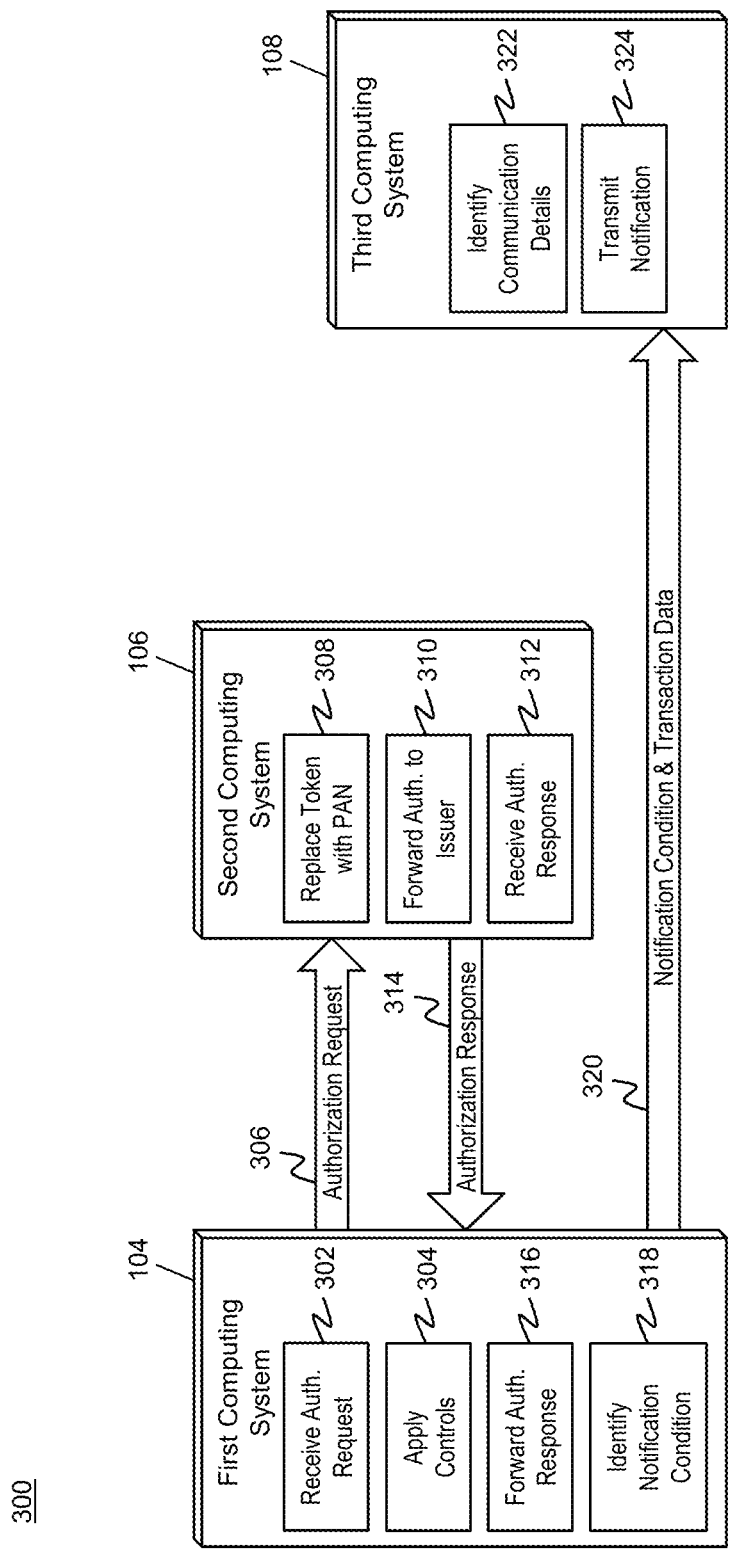
FIG. 3 is a flow diagram illustrating a process for the application of account and transaction controls to a payment token and processing of a transaction and transmission of a notification related thereto using the processing system of FIG. 1 in accordance with exemplary embodiments.

FIG. 3 illustrates a process 300 for the application of account and/or transaction controls to a payment transaction involving the use of a payment token, and the electronic transmission of a notification related thereto using the processing system 102.

In step 302, the receiving device 202 of the first computing system 104 may receive an authorization request for a payment transaction. The authorization request may be received via the payment rails associated with the payment network 110, and may be received from the payment network 110 or directly via the merchant system 116 or an associated entity, such as an acquiring financial institution or a gateway processor. The authorization request may be a transaction message formatted pursuant to one or more standards, such as the ISO 8583 standard, that includes a message type indicator indicative of an authorization request and a plurality of data elements including at least a first data element configured to store a primary account number that includes a payment token number and one or more additional data elements configured to store additional transaction data.

In step 304, the transaction processing module 220 of the first computing system 104 may apply one or more account and/or transaction controls to the authorization request. The application of controls may include the execution of a query by the querying module 218 of the first computing system 104 on the control database 206 to identify a control profile 208 that includes the payment token number stored in the first data element included in the received authorization request, and a determination by the transaction processing module 220 if the payment transaction is in compliance with the account and/or transaction controls included in the identified control profile 208. The compliance may be based on the account and/or transaction controls, any data associated therewith in the control profile 208 (e.g., aggregated data from prior payment transactions), and transaction data stored in corresponding data elements included in the received authorization request. If non-compliance is determined, then, in some embodiments, the transaction processing module 220 may store an indication of such in a data element included in the authorization request prior to forwarding to the issuer system 114. In other embodiments, the transaction processing module 220 may convert the authorization request to an authorization response, include a response code in a corresponding data element that indicates that the transaction is denied, and forward the authorization response for finalization of the payment transaction.

Once the account and/or transaction controls are applied (e.g., and if the first computing system 104 has not generated an authorization response indicating denial that is forwarded for finalization), then, in step 306, the transmitting device 224 of the first computing system 104 may electronically transmit a data signal to the second computing system 106 using internal communication methods of the processing system 102 that is superimposed or otherwise encoded with the authorization request. The receiving device 202 of the second computing system 106 may receive the authorization request. In step 308, the payment token number stored in the first data element included in the authorization request may be replaced by the corresponding transaction account number, also referred to as a payment account number (PAN). The replacement of the payment token number may include the querying of the token database 210 by the querying module 218 of the second computing system 106 to identify a token profile 212 that includes the payment token number and the replacement of the payment token number in the first data element by the transaction processing module 220 of the second computing system 106 with the corresponding transaction account number stored in the identified token profile 212.

In step 310, the transmitting device 224 of the second computing system 106 may forward the authorization request that includes the transaction account number to the associated issuer system 114 for approval or denial. In some instances, the authorization request may be transmitted directly to the issuer system 114 from the processing system 102 via the payment rails or, in instances where the processing system 102 may be a part of the issuer system 114, internal communication networks of the issuer system 114. In other instances, the authorization request may be transmitted to the payment network 110 via the payment rails, and then forwarded to the issuer system 114 via the payment rails.

In step 312, the receiving device 202 of the second computing system 106 may receive an authorization response for the payment transaction. The authorization response may be a transaction message corresponding to the authorization request that includes a message type indicator indicative of the authorization response, the first data element storing the transaction account number, and a second data element configured to store a response code indicating approval or denial of the payment transaction. As part of the receipt of the authorization response, the transaction processing module 220 may be configured to remap the payment token number back into the first data element. In step 314, the transmitting device 224 of the second computing system 106 may forward the authorization response, with the payment token number included in place of the transaction account number, to the first computing system 104 using the internal communication network of the processing system 102. The receiving device 202 of the first computing system 104 may receive the authorization response.

In step 316, the first computing system 104 may perform any actions associated with the processing of the authorization response, and the transmitting device 224 of the first computing system 104 may forward the authorization response back to the merchant system 116 via the payment rails for finalization of the payment transaction. Actions associated with the processing may include the updating of data associated with account and/or transaction controls if the payment transaction was approved (e.g., as indicated by the response code stored in the corresponding data element).

Additional actions may include, in step 318, the identification of any notification conditions that were satisfied by the payment transaction. The satisfaction may be determined by the notification module 222 of the first computing system 104, which may analyze notification conditions included in a notification profile 216 (e.g., identified by the querying module 218 based on an included payment token number) or the identified control profile 208 as compared to the transaction data stored in the data elements included in the authorization response and data stored in the identified control profile 208. In step 320, the transmitting device 224 of the first computing system 104 may electronically transmit a data signal to the third computing system 108 using the internal communication network of the processing system 102 that is superimposed or otherwise encoded with at least the satisfied notification condition(s) and transaction data associated therewith, which may be based on criteria set forth by the consumer 112 for notification. In some embodiments, steps 318 and 320 may be performed by the second computing system 106 instead of the first computing system 104, such as following receipt of the authorization response in step 312.

The receiving device 202 of the third computing system 108 may receive the data signal and, in step 322, may identify communication details associated with the transaction account involved in the payment transaction. The identification of communication details may include the execution of a query on the notification database 214 of the third computing system 108 by a querying module 218 of the third computing system 108 to identify a notification profile 216 that includes the payment token number included in the transaction data provided by the first computing system 104 (e.g., or second computing system 106, as applicable). The communication details may be included in the identified notification profile 216, and include at least a communication method and address. In step 324, the transmitting device 224 of the third computing system 108 may electronically transmit a data signal to the computing device 118 associated with the transaction account based on the address using the communication method, where the data signal is superimposed or otherwise encoded with a notification. The notification may include the transaction data provided by the first computing system 104 or a portion thereof, and any other additional data, such as may be requested by the consumer 112 during registration for the notification service or management thereof.

Figure 4:
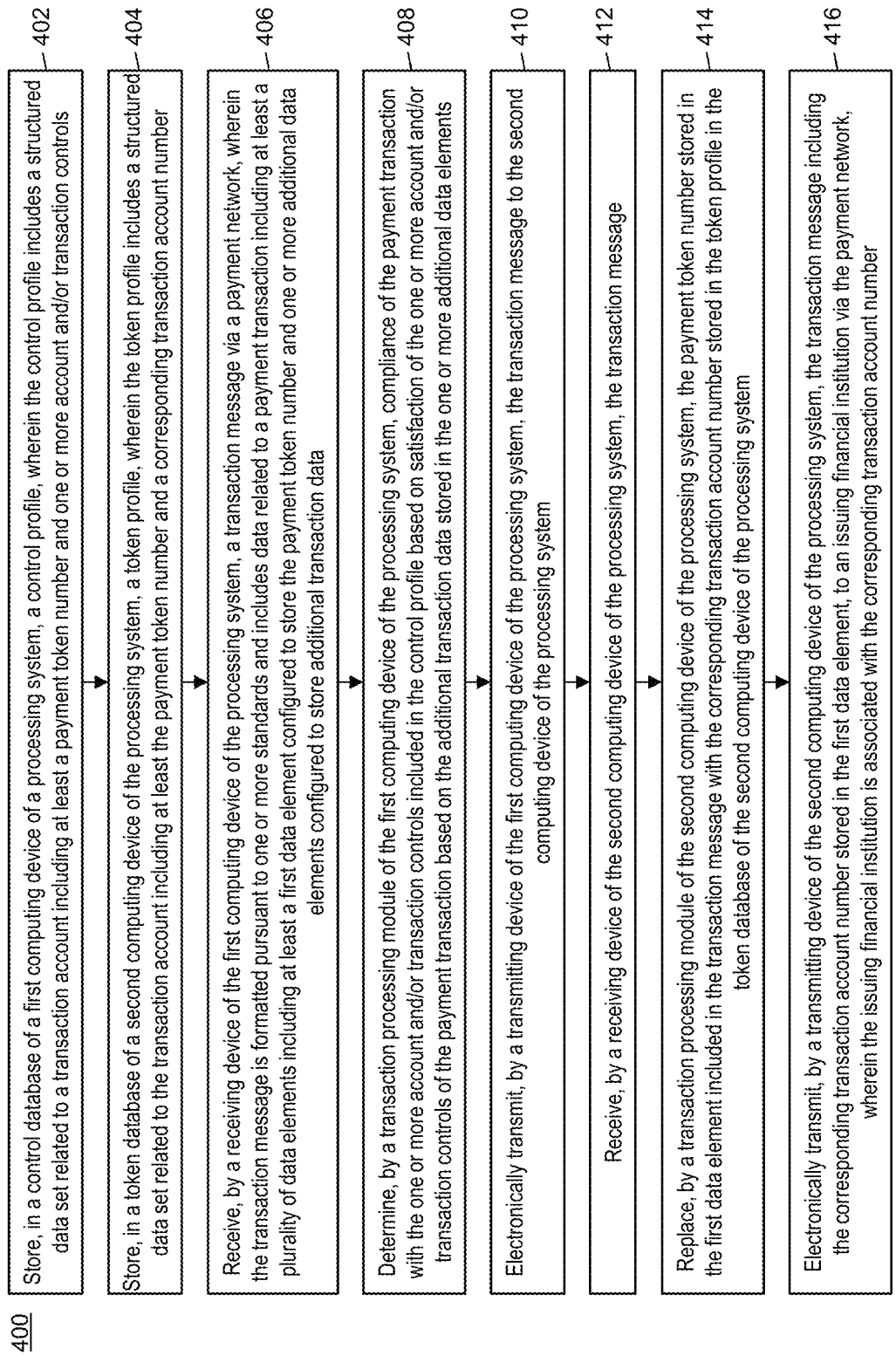
FIG. 4 is a flow chart illustrating an exemplary method for application of account and transaction controls on a payment token in accordance with exemplary embodiments.

Exemplary Method for Application of Account and Transaction Controls on a Payment Token FIG. 4 illustrates a method for the application of account and transaction controls on a payment transaction funded via a payment token using multiple computing devices in a single processing system.

In step 402, a control profile (e.g., control profile 208) may be stored in a control database (e.g., the control database 206) of a first computing device (e.g., the first computing system 104) of a processing system (e.g., the processing system 102), wherein the control profile includes a structured data set related to a transaction account including at least a payment token number and one or more account and/or transaction controls. In step 404, a token profile (e.g., token profile 212) may be stored in a token database (e.g., the token database 210) of a second computing device (e.g., the second computing system 106) of a processing system, wherein the token profile includes a structured data set related to the transaction account including at least the payment token number and a corresponding transaction account number.

In step 406, a transaction message may be received via a payment network (e.g., the payment network 110) by a receiving device (e.g., the receiving device 202) of the first computing device of the processing system, wherein the transaction message is formatted pursuant to one or more standards and includes data related to a payment transaction including at least a plurality of data elements including at least a first data element configured to store the payment token number and one or more additional data elements configured to store additional transaction data. In step 408, compliance of the payment transaction with the one or more account and/or transaction controls included in the control profile may be determined by a transaction processing module (e.g., the transaction processing module 220) of the first computing device of the processing system based on satisfaction of the one or more account and/or transaction controls of the payment transaction based on the additional transaction data stored in the one or more additional data elements. In some embodiments, the one or more account and/or transaction controls may include a control on at least one of: transaction amount, aggregate transaction amount, merchant name, merchant identifier, geographic location, transaction type, product name, product type, number of transactions, transaction frequency, transaction time, and transaction date.

In step 410, the transaction message may be electronically transmitted by a transmitting device (e.g., the transmitting device 224) of the first computing device of the processing system to the second computing device of the processing system. In step 412, the transaction message may be received by a receiving device (e.g., the receiving device 202) of the second computing device of the processing system.

In step 414, the payment token number stored in the first data element included in the transaction message may be replaced by a transaction processing module (e.g., the transaction processing module 220) of the second computing device of the processing system with the corresponding transaction account number stored in the token profile in the token database of the second computing device of the processing system. In step 416, the transaction message including the corresponding transaction account number stored in the first data element may be electronically transmitted by a transmitting device (e.g., the transmitting device 224) of the second computing device of the processing system to an issuing financial institution (e.g., the issuer system 114) via the payment network, wherein the issuing financial institution is associated with the corresponding transaction account number.

In one embodiment, the control profile may further include at least one notification condition, and the method 400 may also include identifying, by a notification module (e.g., the notification module 222) of the first computing device of the processing system, satisfaction of a notification condition stored in the control profile based on the determination of compliance of the payment transaction with the one or more account and/or transaction controls. In a further embodiment, the control profile may further include communication details, and the method 400 may further include electronically transmitting, by the transmitting device of the first computing device of the processing system, a data signal superimposed with a transaction notification related to the satisfied notification condition to an external computing device based on the communication details. In another further embodiment, the method 400 may further include: storing, in a notification database (e.g., the notification database 214) of a third computing device (e.g., the third computing system 108) of the processing system, a notification profile (e.g., notification profile 216), wherein the notification profile includes a structured data set related to a transaction account including at least the payment token number and communication details; electronically transmitting, by the transmitting device of the first computing device of the processing system, a first data signal superimposed with the satisfied notification condition to the third computing device of the processing system; receiving, by a receiving device (e.g., the receiving device 202) of the third computing device of the processing system, the first data signal; and electronically transmitting, by a transmitting device (e.g., the transmitting device 224) of the third computing device of the processing system, a second data signal superimposed with a transaction notification related to the satisfied notification condition to an external computing device based on the communication details. In an even further embodiment, the first data signal may further include the payment token number and additional transaction data stored in the one or more additional data elements included in the received transaction message.

In some embodiments, the token profile may further include at least one notification condition, and the method 400 may also include identifying, by a notification module (e.g., the notification module 222) of the second computing device of the processing system, satisfaction of a notification condition stored in the token profile based on the determination of compliance of the payment transaction with the one or more account and/or transaction controls. In a further embodiment, the token profile may further include communication details, and the method 400 may further include electronically transmitting, by the transmitting device of the second computing device of the processing system, a data signal superimposed with a transaction notification related to the satisfied notification condition to an external computing device based on the communication details. In another further embodiment, the method 400 may further include: storing, in a notification database of a third computing device of the processing system, a notification profile, wherein the notification profile includes a structured data set related to a transaction account including at least the corresponding transaction account number and communication details; electronically transmitting, by the transmitting device of the second computing device of the processing system, a first data signal superimposed with the satisfied notification condition to the third computing device of the processing system; receiving, by a receiving device of the third computing device of the processing system, the first data signal; and electronically transmitting, by a transmitting device of the third computing device of the processing system, a second data signal superimposed with a transaction notification related to the satisfied notification condition to an external computing device based on the communication details. In an even further embodiment, the first data signal may further include the corresponding transaction account number and additional transaction data stored in the one or more additional data elements included in the received transaction message.

Payment Transaction Processing System and Process

Figure 5:
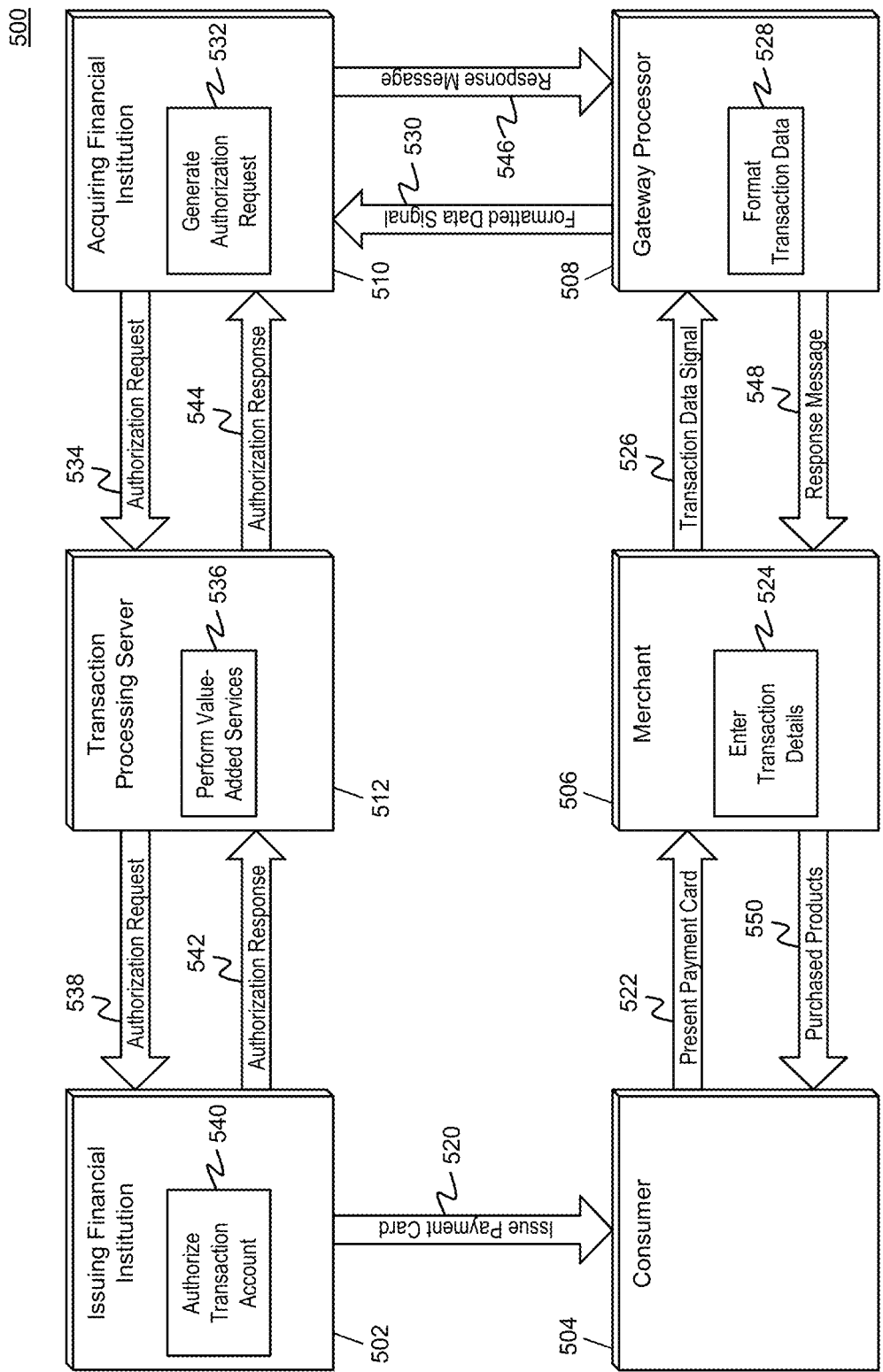
FIG. 5 is a flow diagram illustrating the processing of a payment transaction in accordance with exemplary embodiments.

FIG. 5 illustrates a transaction processing system and a process 500 for the processing of payment transactions in the system, which may include the processing of thousands, millions, or even billions of transactions during a given period (e.g., hourly, daily, weekly, etc.). The process 500 and steps included therein may be performed by one or more components of the system 100 discussed above, such as the processing system 102, first computing system 104, second computing system 106, payment network 110, consumer 112, issuer system 114, merchant system 116, etc. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the processes illustrated in FIGS. 3 and 4, discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 502 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, assuming the transaction was approved, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 512. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution 502. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
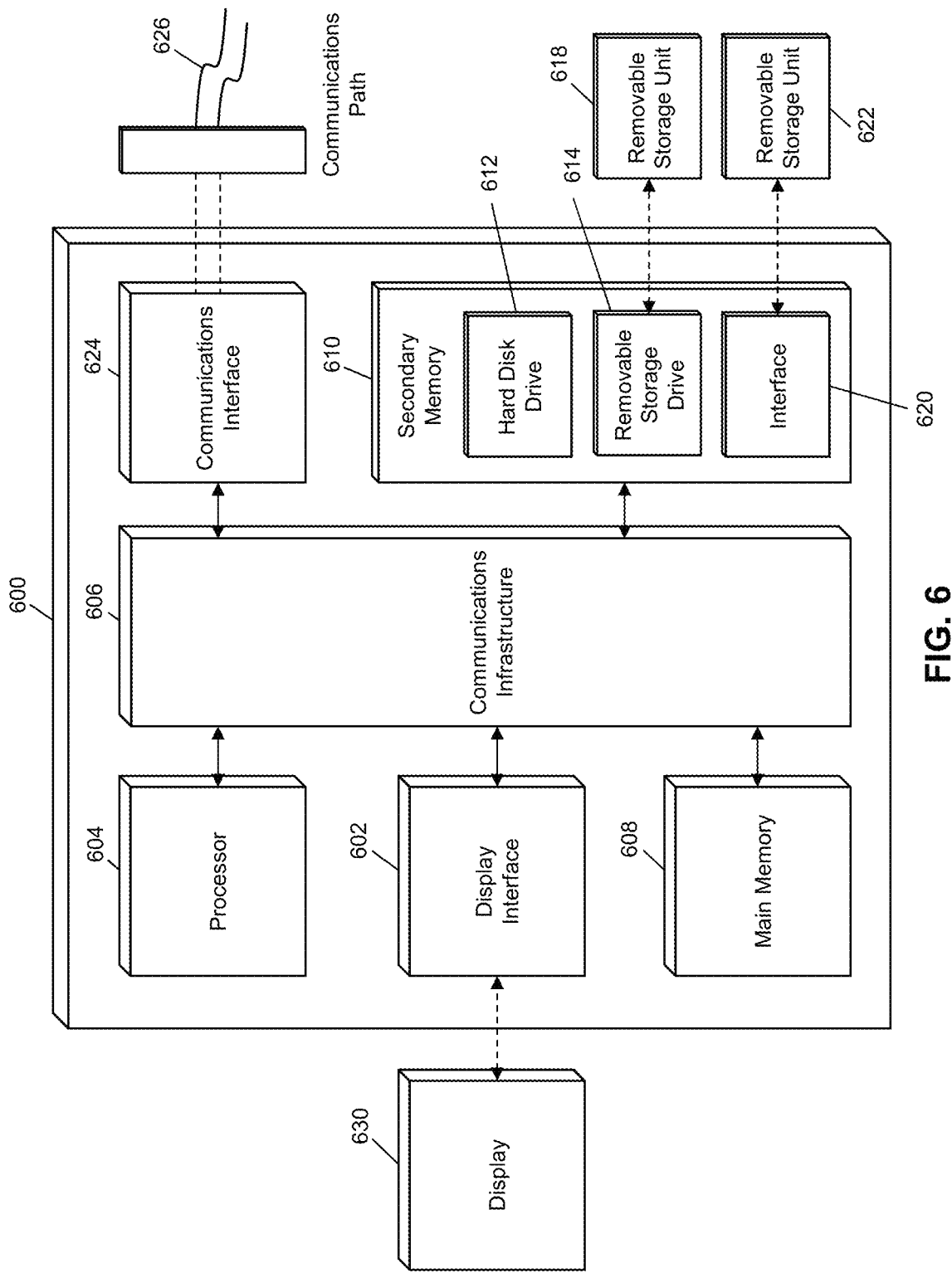
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the first computing system 104, second computing system 106, and third computing system 108 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for monitoring for unwanted recurring transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for application of account and transaction controls on a payment token, comprising:
   storing, in a control database of a first computing device of a processing system, a control profile, wherein the control profile includes a structured data set related to a transaction account including at least one or more account and/or transaction controls applicable to payment transactions funded with the transaction account, a transaction account number, and a payment token number generated for use with the transaction account;
   storing, in a token database of a second computing device of the processing system, a token profile, wherein the token profile includes a structured data set related to the transaction account including at least the payment token number and a corresponding transaction account number;
   receiving, by a receiving device of the first computing device of the processing system, a transaction message via a payment network, wherein the transaction message is formatted pursuant to one or more standards and includes data related to a payment transaction including at least a plurality of data elements including at least a first data element configured to store at least a transaction account number and one or more additional data elements configured to store additional transaction data;
   determining, by a transaction processing module of the first computing device of the processing system, compliance of the payment transaction with at least one of the one or more account and transaction controls included in the control profile;
   when the first data element in the transaction message does not also store a payment token number:
      determining, by a transaction processing module of the first computing device, whether transaction data contained in the one or more additional data elements of the transaction message complies with the one or more account and transaction controls;
electronically transmitting, by a transmitting device of the first computing device of the processing system, a first authorization response for the payment transaction to a merchant computing system when the transaction data does not comply with the one or more account and transaction controls;
when the first data element in the transaction message also stores a payment token number and the transaction data complies with the one more account and transaction controls:
electronically transmitting, by the transmitting device of the first computing device of the processing system, the transaction message to the second computing device of the processing system;
receiving, by a receiving device of the second computing device of the processing system, the transaction message;
replacing, by a transaction processing module of the second computing device of the processing system, the payment token number stored in the first data element included in the transaction message with the corresponding transaction account number stored in the token profile in the token database of the second computing device of the processing system; and
electronically transmitting, by a transmitting device of the second computing device of the processing system, the transaction message including the corresponding transaction account number stored in the first data element, to an issuing financial institution, wherein the issuing financial institution is associated with the corresponding transaction account number;
receiving, by the receiving device of the second computing device of the processing system, a second authorization response from the issuing financial institution, the second authorization response including the first data element storing the corresponding transaction account number;
replacing, by the transaction processing module of the second computing device, the corresponding transaction account number stored in the first data element included in the second authorization response with the payment token number stored in the first data element included in the transaction message;
electronically transmitting, by the transmitting device of the second computing device of the processing system, the second authorization response including the payment token number stored in the first data element to the first computing system;
receiving, by the receiving device of the first computing device of the processing system, the second authorization response from the second computing device of the processing system; and
electronically transmitting, by a transmitting device of the first computing device of the processing system, the second authorization response for the payment transaction to the merchant computing system.

2. The method of claim 1, wherein the control profile further includes at least one notification condition, and the method further comprises:
identifying, by a notification module of the first computing device of the processing system, satisfaction of a notification condition stored in the control profile based on the determination of compliance of the payment transaction with at least one of the one or more account and transaction controls.

3. The method of claim 2, further comprising:
storing, in a notification database of a third computing device of the processing system, a notification profile, wherein the notification profile includes a structured data set related to a transaction account including at least the payment token number and communication details;
electronically transmitting, by the transmitting device of the first computing device of the processing system, a first data signal superimposed with the identified notification condition to the third computing device of the processing system;
receiving, by a receiving device of the third computing device of the processing system, the first data signal; and
electronically transmitting, by a transmitting device of the third computing device of the processing system, a second data signal superimposed with a transaction notification related to the identified notification condition to an external computing device based on the communication details.

4. The method of claim 3, wherein the first data signal further includes the payment token number and additional transaction data stored in the one or more additional data elements included in the received transaction message.

5. The method of claim 1, wherein the token profile further includes at least one notification condition, and the method further comprises:
identifying, by a notification module of the second computing device of the processing system, satisfaction of a notification condition stored in the token profile based on the determination of compliance of the payment transaction with at least one of the one or more account and transaction controls.

6. The method of claim 5, further comprising:
storing, in a notification database of a third computing device of the processing system, a notification profile, wherein the notification profile includes a structured data set related to a transaction account including at least the corresponding transaction account number and communication details;
electronically transmitting, by the transmitting device of the second computing device of the processing system, a first data signal superimposed with the identified notification condition to the third computing device of the processing system;
receiving, by a receiving device of the third computing device of the processing system, the first data signal; and
electronically transmitting, by a transmitting device of the third computing device of the processing system, a second data signal superimposed with a transaction notification related to the identified notification condition to the external computing device based on the communication details.

7. The method of claim 6, wherein the first data signal further includes the corresponding transaction account number and additional transaction data stored in the one or more additional data elements included in the received transaction message.

8. The method of claim 1, wherein at least one of the one or more account and transaction controls includes a control on at least one of: transaction amount, aggregate transaction amount, merchant name, merchant identifier, geographic location, transaction type, product name, product type, number of transactions, transaction frequency, transaction time, and transaction date.

9. The method of claim 1, further comprising:
identifying, by a notification module of the first computing device or the second computing device of the processing system, one or more notification conditions satisfied by the payment transaction based on information provided in the first or second authorization response, the one or more notification conditions associated with at least one of the payment transaction, the transaction account, and the one or more account and transaction controls; and
transmitting, by the first computing device of the processing system, the identified notification condition to a third computing device of the processing system,
wherein the first and second computing devices are configured for communication on the payment network, and the third computing device is configured for communication with an external computing device.

10. A system for application of account and transaction controls on a payment token, comprising:
a control database of a first computing device of a processing system configured to store a control profile, wherein the control profile includes a structured data set related to a transaction account including at least one of one or more account and transaction controls applicable to payment transactions funded with the transaction account, a transaction account number, and a payment token number generated for use with the transaction;
a token database of a second computing device of the processing system configured to store a token profile, wherein the token profile includes a structured data set related to the transaction account including at least the payment token number and a corresponding transaction account number;
a receiving device of the first computing device of the processing system configured to receive a transaction message via a payment network, wherein the transaction message is formatted pursuant to one or more standards and includes data related to a payment transaction including at least a plurality of data elements including at least a first data element configured to store at least a transaction account number and one or more additional data elements configured to store additional transaction data;
a transaction processing module of the first computing device of the processing system configured to determine compliance of the payment transaction with the one or more account and/or transaction controls included in the control profile;
when the first data element in the transaction message does not also store a payment token number:
a processing device of the first computing device configured to determine whether transaction data contained in the one or more additional data elements of the transaction message complies with the one or more account and transaction controls;
a transmitting device of the first computing device of the processing system configured to transmit a first authorization response for the payment transaction to a merchant computing system when the transaction data does not comply with the one or more account and transaction controls;
when the first data element in the transaction message also stores a payment token number and the transaction data complies with the one more account and transaction controls:
the transmitting device of the first computing device of the processing system is further configured to electronically transmit the transaction message to the second computing device of the processing system;
a receiving device of the second computing device of the processing system configured to receive the transaction message;
a transaction processing module of the second computing device of the processing system configured to replace the payment token number stored in the first data element included in the transaction message with the corresponding transaction account number stored in the token profile in the token database of the second computing device of the processing system; and
a transmitting device of the second computing device of the processing system configured to electronically transmit the transaction message including the corresponding transaction account number stored in the first data element, to an issuing financial institution, wherein the issuing financial institution is associated with the corresponding transaction account number;
the receiving device of the second computing device of the processing system further configured to receive a second authorization response from the issuing financial institution, the second authorization response including the first data element storing the corresponding transaction account number;
the transaction processing module of the second computing device of the processing system configured to replace the corresponding transaction account number stored in the first data element included in the second authorization response with the payment token number stored in the first data element included in the transaction message;
the transmitting device of the second computing device of the processing system further configured to transmit the second authorization response including the payment token number stored in the first data element to the first computing system;
the receiving device of the first computing device of the processing system further configured to receive the second authorization response from the second computing device of the processing system; and
the transmitting device of the first computing device of the processing system further configured to transmit the second authorization response for the payment transaction to the merchant computing system
a notification module of the first computing device or the second computing device of the processing system, the notification module being configured to identify one or more notification conditions satisfied by the payment transaction based on information provided in the first or second authorization response, the one or more notification conditions associated with at least one of the payment transaction, the transaction account, and the one or more account and transaction controls;
the transmitting device of the first computing device of the processing system further configured to transmit the identified notification condition to a third computing device of the processing system,
wherein the first and second computing devices are configured for communication on the payment network, and the third computing device is configured for communication with an external computing device.

11. The system of claim 10, wherein the control profile further includes at least one notification condition, and the notification module of the first computing device of the processing system configured to identify satisfaction of a notification condition stored in the control profile based on the determination of compliance of the payment transaction with at least one of the one or more account and transaction controls.

12. The system of claim 11, further comprising:
a receiving device of a third computing device of the processing system;
a transmitting device of the third computing device of the processing system; and
a notification database of the third computing device of the processing system configured to store a notification profile, wherein the notification profile includes a structured data set related to a transaction account including at least the payment token number and communication details, wherein
the transmitting device of the first computing device of the processing system is further configured to electronically transmit a first data signal superimposed with the identified notification condition to the third computing device of the processing system,
the receiving device of the third computing device of the processing system is configured to receive the first data signal, and
the transmitting device of the third computing device of the processing system is configured to electronically transmit a second data signal superimposed with a transaction notification related to the identified notification condition to the external computing device based on the communication details.

13. The system of claim 12, wherein the first data signal further includes the payment token number and additional transaction data stored in the one or more additional data elements included in the received transaction message.

14. The system of claim 10, wherein the token profile further includes at least one notification condition, and the notification module of the second computing device of the processing system configured to identify satisfaction of a notification condition stored in the token profile based on the determination of compliance of the payment transaction with at least one of the one or more account and transaction controls.

15. The system of claim 14, further comprising:
a receiving device of a third computing device of the processing system;
a transmitting device of the third computing device of the processing system; and
a notification database of the third computing device of the processing system configured to store a notification profile, wherein the notification profile includes a structured data set related to a transaction account including at least the corresponding transaction account number and communication details, wherein
the transmitting device of the second computing device of the processing system is further configured to electronically transmit a first data signal superimposed with the identified notification condition to the third computing device of the processing system,
the receiving device of the third computing device of the processing system is configured to receive the first data signal, and
the transmitting device of the third computing device of the processing system is configured to electronically transmit a second data signal superimposed with a transaction notification related to the identified notification condition to the external computing device based on the communication details.

16. The system of claim 15, wherein the first data signal further includes the corresponding transaction account number and additional transaction data stored in the one or more additional data elements included in the received transaction message.

17. The system of claim 10, wherein at least one of the one or more account and transaction controls includes a control on at least one of: transaction amount, aggregate transaction amount, merchant name, merchant identifier, geographic location, transaction type, product name, product type, number of transactions, transaction frequency, transaction time, and transaction date.

18. The system of claim 10, further comprising:
a notification module of the first computing device or the second computing device of the processing system, the notification module being configured to identify one or more notification conditions satisfied by the payment transaction based on information provided in the first or second authorization response, the one or more notification conditions associated with at least one of the payment transaction, the transaction account, and the one or more account and transaction controls; and
the transmitting device of the first computing device of the processing system further configured to transmit the identified notification condition to a third computing device of the processing system,
wherein the first and second computing devices are configured for communication on the payment network, and the third computing device is configured for communication with an external computing device.

* * * * *